Aug. 11, 1942.            M. BANYAI                2,292,985
SLIDING CLASP FASTENER
Filed April 9, 1941
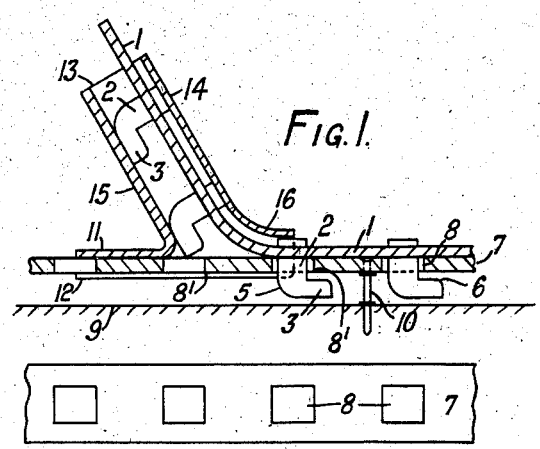
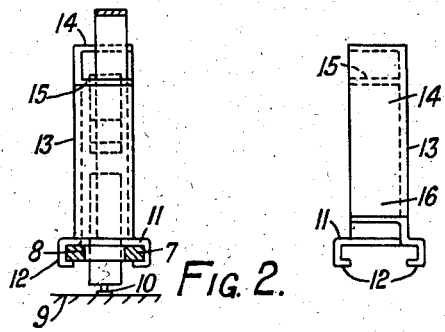
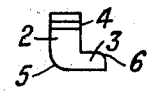 
Fig. 5.    Fig. 6.
Fig. 7.
Inventor
Maurus Banyai
By Gifford, Scull, Burgess
Attorneys Patented Aug. 11, 1942

2,292,985

UNITED STATES PATENT OFFICE 2,292,985

SLIDING CLASP FASTENER

Maurus Banyai, Glasgow, Scotland, assignor to Crown Fastener Corporation, Warren, R. I., a corporation of Delaware Application April 9, 1941, Serial No. 387,585

6 Claims. (Cl. 24—205)

This invention relates to improvements in sliding clasp fasteners suitable for use, for example, for attaching a mounting member unitary with a screen, tarpaulin, or the like to a fixed or movable bearer, e. g., for attaching a screen over a window opening or for attaching a tarpaulin over a ship's hatchway, or to a wagon.

A sliding clasp fastener according to the invention comprises a series of L-shaped male fastener elements secured in spaced relation to a flexible mounting member and each presenting a projecting foot, an anchorage-forming metallic or other strip presenting a series of spaced apertures adapted to be engaged by the male fastener elements and alternating with inter-aperture bar elements which are engageable hookwise by the projecting feet of the respective male fastener elements, and a slider member mounted on and slidable longitudinally of the strip for the purpose of causing the male fastener elements to enter into locking engagement with the under face of the apertured strip and for effecting disengagement of the fastener elements from the strip, said slider member presenting an inclined guideway which is traversed by the mounting member and fastener elements in the travel of the slider member.

Fig. 1 of the accompanying drawing is a fragmentary vertical section of a sliding clasp fastener according to the invention. Fig. 2 is an end view corresponding to Fig. 1. Fig. 3 is an end view of the slider member. Fig. 4 is a plan view of the anchorage-forming strip. Figs. 5, 6 and 7 are, respectively, a side view, an end view and a plan view of a male fastener element.

As illustrated by the drawing, a series of male fastener elements are secured in spaced relation to a flexible mounting member 1. Each male fastener element is in the form of an L-shaped block and presents a stem part 2, and a projecting foot part 3 at right angles to the stem part 2. The stem part 2 is secured to the mounting member 1. Conveniently, the stem part 2 is bifurcated to straddle one marginal edge of the mounting member 1, the stem part 2 being formed with a slit 4 into which the edge of the mounting member 1 is inserted and clenched by the application of pressure on the end face of the stem 2.

The heel 5 and the upper edge of the toe part 6 of each L-shaped fastener element may be rounded.

The anchorage-forming member consists of a sheet-metal strip 7 formed with apertures 8 which are spaced apart in correspondence with the spacing of the L-shaped fastener elements on the mounting member 1.

The apertures 8 in the strip 7 are of rectangular form so as closely to accommodate laterally the stem parts 2 of the L-shaped fastener elements which protrude from the mounting member, it being understood that the toe parts of the L-shaped fastener elements engage hookwise underneath the edges 8' of the apertures 8. The strip 7 is attached to a wood or other bearer 9 by nail supports 10 in such wise that the underside of the strip is so spaced from the bearer as to afford clearance for the foot parts 3 of the L-shaped fastener elements when engaging the apertured strip 7.

The slider member comprises a base 11 of which the longitudinal marginal portions 12 are overturned to embrace the longitudinal edges of the strip 7. The base 11 is integral with a superstructure consisting of a vertical wall 13 having upper and lower laterally projecting flanges 14 and 15 which present a guideway for the mounting member and the male fastener elements, the guideway being open at one side and at both ends. The upper flange 14 forming the top boundary of the guideway is provided, at the lower end of the guideway, with a curved portion 16 which constrains each L-shaped fastener element to perform rocking movement about an axis transverse to the strip 7, as said fastener element moves into engagement with an aperature in the strip and as said element is withdrawn from the aperture.

What is claimed is:

1. In a sliding clasp fastener, in combination with a flexible mounting member, a series of L-shaped male fastener elements secured in spaced relation to said mounting member, a bearer, an apertured strip secured in spaced relation to said bearer, a slider mounted on said strip, and means carried by said slider for causing said fastener elements to penetrate the apertures in said strip and the space between the bearer and strip and to engage hookwise the under face of said apertured strip.

2. A sliding clasp fastener comprising a flexible mounting member, a series of L-shaped male fastener elements secured in spaced relation to said mounting member, each fastener element having a projecting foot, a bearer, an anchorage-forming strip secured to and spaced from the said bearer and formed with a series of apertures spaced in correspondence with the spacing of said fastener elements, a slider mounted on said anchorage-forming strip and presenting a guideway for said mounting member and said male fastener elements, said guideway having a curved portion whereby each fastener element is caused to perform rocking movement about an axis transverse to said anchorage-forming member as said fastener element moves into and out of engagement with the under face of said anchorage-forming strip.

3. A sliding clasp fastener comprising a flexible mounting member, a series of L-shaped male fastener elements secured in spaced relation to said mounting member, a bearer, an apertured anchorage-forming strip secured to and spaced from said bearer, a slider mounted on said strip, and means carried by said slider for effecting engagement and disengagement of said L-shaped elements and the under face of said apertured strip.

4. A sliding clasp fastener comprising a series of L-shaped male fastener elements each of which is formed with a stem part having a slit adjacent to an end thereof and a projecting foot portion, a flexible mounting member secured in the slits of said elements, said elements being spaced apart, a bearer, a perforated anchorage-forming strip secured to and spaced from said bearer, and a slider mounted on said strip and presenting a guideway open at both ends serving to guide said elements and one edge of said mounting member, said guideway being unitary with said slider and having a curved part shaped to rock said male fastener elements in the travel of said slider.

5. A slide fastener assembly for securing a flexible mounting member to a support comprising a series of male fastener elements secured in spaced relation to said mounting member; a strip mounted on and secured in spaced relation to said support, said strip having a surface facing the opposing surface of the support and said strip having a series of apertures defined by edges; slide means slidably engaging said strip and adapted to guide said elements into and out of engagement with said strip; each fastener element having a part which in normal locking engagement is in clearance-spaced relation to said edges and a part which is received in the space between the said surface of the strip and the opposing surface of the support and is in clearance-spaced relation to said surfaces; whereby free engagement and disengagement of the fastener elements with the strip is provided while preserving normal locking engagement.

6. A slide fastener assembly for securing a flexible mounting member to a support comprising a series of male fastener elements secured in spaced relation to said mounting member; a rigid securing member mounted on and in spaced relation to said support, said securing member having a surface facing the opposing surface of the support, said securing member having a series of apertures defined by edges; slide means slidably engaging said securing member and adapted to guide said fastener elements into and out of engagement with said securing member; each fastener element having a part which in normal locking engagement is in clearance-spaced relation to said edges and a part which is received in the space between the surface of the securing member and the opposing surface of the support and is in clearance-spaced relation to said surfaces; whereby free engagement and disengagement of the fastener elements with the supporting member is provided while preserving normal locking means.

MAURUS BANYAI.